United States Patent [19]

Hammons et al.

[11] Patent Number: 5,031,578
[45] Date of Patent: Jul. 16, 1991

[54] PET LITTER BOX SYSTEM WHICH PREVENTS THE DEVELOPMENT OF UNPLEASANT ODORS

[75] Inventors: John L. Hammons, Hamilton; William R. Ouellette, Cincinnati; Bruce W. Lavash, West Chester, all of Ohio

[73] Assignee: The Procter & Gamble Company, Cincinnati, Ohio

[21] Appl. No.: 507,696

[22] Filed: Apr. 10, 1990

[51] Int. Cl.$^5$ ............................................. A01K 29/00
[52] U.S. Cl. ..................................... 119/167; 119/169
[58] Field of Search ............................................. 119/1

[56] References Cited

U.S. PATENT DOCUMENTS

| | | | |
|---|---|---|---|
| 3,796,188 | 3/1974 | Bradstreet | 119/1 |
| 3,809,013 | 5/1974 | Rigney et al. | 119/1 |
| 3,828,731 | 8/1974 | White | 119/1 |
| 3,892,846 | 7/1975 | Wortham | 424/76 |
| 3,965,863 | 6/1976 | Scott | 119/1 |
| 4,096,827 | 6/1978 | Cotter | 119/1 |
| 4,203,388 | 5/1980 | Cortigene et al. | 119/1 |
| 4,279,217 | 7/1981 | Behringer | 119/1 |
| 4,312,295 | 1/1982 | Harrington | 719/1 |
| 4,405,354 | 9/1983 | Thomas, II et al. | 71/21 |
| 4,458,629 | 7/1984 | Gerber | 119/1 |

(List continued on next page.)

OTHER PUBLICATIONS

PCT International Publication Number WO 88/00434, International Publication Date 1/28/88, P. Yananton–Non-Absorbent Litter for Use with Absorbent Pad.

Co-Pending Commonly Assigned U.S. Patent Application of W. R. Ouellette et al., Ser. No. 507,695 Filed Apr. 10, 1990 (No Copy Supplied).

Animal Waste Collection System Comprising Nonsorbent, Nonclumping Litter, Liquid Sorbent Means & Filter.

Primary Examiner—Paul J. Hirsch
Attorney, Agent, or Firm—E. Kelly Linman; John V. Gorman; Richard C. Witte

[57] ABSTRACT

An animal litter box system which reduces odor and extends the useful life of litter by delivering and concentrating urine in an area specifically designed to prevent odor formation. The system of the present invention permits almost indefinite recycling of the substantially nonsorbent, nonclumping granular litter material used by the animal to bury its solid excreta. The combination further includes a porous filtering member exhibiting a pore size which will readily permit the granular litter material to pass therethrough, yet retain substantially all of the solid animal excreta coming in contact with the filtering member during the filtering operation. A protective member capable of substantially resisting damage when subjected to digging or clawing by animals is secured in superposed relation to and completely overlies the uppermost surface of the porous filtering member. The protective member includes means for forming an opening having a predetermined periphery in its uppermost surface when the protective member is lifted from the litter box to initiate the filtering operation. The filtering member is secured in underlying relation about the predetermined periphery of the opening formed in the protective member so that the filtering member is protected from damage due to digging or clawing by animals during the normal use cycle, yet substantially all of the nonsorbent, nonclumping granular litter material containing the solid animal excreta will pass through the opening and be filtered by the filtering member when the protective member is lifted from the litter box. The protective member further includes liquid sorbent means including an odor abatement agent to prevent or reduce the development of odor in the absorbed liquid. The liquid sorbent means absorbs liquid animal excreta so that the liquid animal excreta contained in the sorbent means can be removed from the litter box and disposed of along with the solid animal excreta retained on the filtering member when the filtering operation has been completed.

12 Claims, 6 Drawing Sheets

U.S. PATENT DOCUMENTS

| | | | |
|---|---|---|---|
| 4,469,046 | 9/1984 | Yananton | 119/1 |
| 4,494,481 | 1/1985 | Rodriguez et al. | 119/1 |
| 4,494,482 | 1/1985 | Arnold | 119/1 |
| 4,517,919 | 5/1985 | Benjamin et al. | 119/1 |
| 4,534,315 | 8/1985 | Sweeney | 119/1 |
| 4,615,300 | 10/1986 | McDonough | 119/1 |
| 4,628,863 | 12/1986 | Eichenauer | 119/1 |
| 4,640,225 | 2/1987 | Yananton | 119/1 |
| 4,649,862 | 3/1987 | Neary | 119/1 |
| 4,711,198 | 12/1987 | Mossbarger | 119/1 |
| 4,721,059 | 1/1988 | Lowe | 119/1 |
| 4,723,510 | 2/1988 | Skillestad | 119/1 |
| 4,724,955 | 2/1988 | Martin et al. | 119/1 |
| 4,756,273 | 7/1988 | Yananton | 119/1 |
| 4,763,603 | 8/1988 | Coes | 119/1 |
| 4,766,845 | 8/1988 | Bavas | 119/1 |
| 4,771,731 | 9/1988 | Derx et al. | 119/1 |
| 4,774,907 | 10/1988 | Yananton | 119/1 |
| 4,784,082 | 11/1988 | Wolfe | 119/1 |
| 4,800,841 | 1/1989 | Yananton et al. | 119/1 |
| 4,802,442 | 2/1989 | Wilson | 119/1 |
| 4,817,560 | 4/1989 | Prince et al. | 119/1 |
| 4,840,140 | 6/1989 | Yananton et al. | 119/1 |
| 4,842,593 | 6/1989 | Jordan et al. | 604/360 |
| 4,844,010 | 7/1989 | Ducharme et al. | 119/1 |
| 4,848,274 | 7/1989 | Yananton | 119/1 |
| 4,852,518 | 8/1989 | Yananton | 119/1 |
| 4,869,204 | 9/1989 | Yananton | 119/1 |
| 4,870,924 | 10/1989 | Wolfe | 119/1 |
| 4,913,954 | 4/1990 | Mack | 428/213 |

PET LITTER BOX SYSTEM WHICH PREVENTS THE DEVELOPMENT OF UNPLEASANT ODORS

TECHNICAL FIELD

This invention relates to an inexpensive animal litter system which is capable of preventing the development of unpleasant odors over an extended period of time.

BACKGROUND ART

The owners of household pets, particularly cats, perceive the development of odors in animal litter boxes as a significant problem. Attempts to alleviate this problem have ranged from the addition of perfume and odor adsorbents to mask or adsorb odors once formed, to the use of chemical or physical treatments of the litter to prevent odor formation. These approaches have met with limited success due to several factors: lack of acceptance by the animal resulting in avoidance of the litter box; expense of the treatment; inconvenience of practical use; and/or concerns of safe exposure of the chemical agents employed to the animal and/or pet owner.

Prior art attempts to deal with odors following their formation include the use of cyclodextrin in animal litter as both a nitrogenous compound absorber and as a fragrance carrier, as disclosed in U.S. Pat. No. 4,844,010 issued on July 4, 1989 to Ducharme et al. Unfortunately, household pets often dislike the smell of such products and avoid the use of the litter. Moreover, since these materials must mask odors, they are effective only over a limited period of time.

Animal litter odors have also been dealt with by the use of deodorizers. U.S. Pat. No. 4,203,388 issued on May 10, 1980 to Cortigene et al. teaches the use of a deodorant, such as sodium bicarbonate, in amounts of between about 1% and about 10% of the dry weight of the litter. Such large amounts of deodorizer are necessitated since the litter itself is also used as an absorbent for urine, requiring the deodorizer to be homogeneously dispersed throughout the particles of the litter.

U.S. Pat No. 3,965,863 issued on June 29, 1976 to Scott describes a chemical litter unit with separate holding tanks for solid and liquid excreta, with appropriate chemical solutions for deodorizing purposes in each tank. Non-absorbent chips are suggested as a re-usable litter. This system requires intimate contact of the pet owner with both excreta and with the chemical solutions used as deodorizers. The device is expensive to manufacture, as well as expensive and inconvenient to maintain.

U.S. Pat. No. 4,534,315 issued on Aug. 13, 1985 to Sweeney discloses an animal litter container employing an upper layer of material which is substantially non-absorbent to moisture, such as sand, over a layer of moisture-absorbent material such as clay, separated by a foraminous liquid-permeable barrier intended to reduce odors emanating from the lower layer. However, no means are provided to prevent the formation of such odors. Furthermore, the foraminous barrier must strike a balance between ease of fluid passage to the absorbent layer on the one hand versus the escape of odors from the lowermost absorbent layer on the other, e.g. larger and more numerous perforations in the barrier layer will allow more rapid and complete passage of fluid to the absorbent layer, but will also provide a means for odors to more readily escape from the lowermost absorbent layer.

The prior art also discloses attempts to prevent the formation of certain unpleasant odors. For example, U.S. Pat. No. 4,405,354 issued on Sept. 20, 1983 to Thomas et al. discloses the use of buffering agents to prevent gaseous ammonia from escaping into the air. However, such buffering agents serve only to prevent the formation of gaseous ammonia, doing nothing against other unpleasant odors. Further, the amounts of such agents range from about 0.5% to about 25% by weight, since all of the absorbent litter must be treated with the agent to provide sufficient contact with the urine.

Fungicides and bacteriostats have also been disclosed in the prior art as means to prevent the formation of odors in animal litters. U.S. Pat. No. 4,517,919 issued on May 21, 1985 to Benjamin et al. discloses the use of undecylenic acid in amounts from about 1000 to about 10,000 ppm and a bacteriostat in amounts from about 25 to 500 ppm. High concentrations of these materials are necessary, since any portion of the absorbent litter may be exposed to urine.

Still other prior art methods for preventing odor development from bacterial action have included heating to destroy bacteria, and desiccation of the litter by heat or evaporation. U.S. Pat. No. 4,649,862 issued on Mar. 17, 1987 to Neary discloses a sanitizing device for the litter box which applies heat to the litter to destroy bacteria. However, this device hastens the evaporation of urine into the air, thereby increasing the severity of the odor associated with the urine.

All of the aforementioned prior art references disclose odor abatement means intended to function in the animal litter itself. Another known prior art odor abatement system employs a litter box liner which acts in conjunction with the litter. U.S. Pat. No. 4,852,518 issued on Aug. 1, 1989 to Yananton teaches the use of a sorbtive-desiccant pad structure to prevent significant odor formation. The patent teaches that the pad disperses and evaporates the urine, causing bacteria to die or become dormant, and thereby preventing odor formation. Non-absorbent litter is employed to aid liquid transfer to the pad. However, as pointed out earlier herein, rapidly evaporating urine into the air may lead to significant odor due to the inherent odor of the animal urine itself, regardless of the absence of bacterial action. Furthermore, Yananton teaches the use of only one quarter to one half inch of granular litter in order to allow the evaporation of urine to occur. Normally, at least two to three inches of granular litter are required to afford the animal an opportunity to bury its solid waste. The use of such small amounts of litter tends to discourage the animal from using the litter box. In addition, it can result in significant odors emanating from unburied fecal matter.

U.S. Pat. No. 4,494,482 issued on Jan. 22, 1985 to Arnold also discloses the use of an absorbent pad to prevent odor formation. This patent further teaches the use of about 5,000 to about 30,000 ppm of a bacteriostat in the absorbent pad to control odor. Because these pads are used in conjunction with absorbent litter, e.g.. clay, the suggested amounts of bacteriostat in the pad are extremely high to account for the large amount of untreated litter in the litter box. According to the patent's teachings, a pad weighing 50 grams used in conjunction with 2,000 grams of untreated clay must contain 4,100 ppm of bacteriostat in order to maintain an overall level of 100 ppm of bacteriostat in the combined material in the litter box. Such high levels of bacteriostat are generally undesirable from the standpoint of safe levels of exposure to the pet and the pet owner, as well as from the standpoint of materials cost.

Accordingly, it is a principal object of the present invention to provide an animal excrement collection system which prevents the development of unpleasant odors over an extended period of time, which minimizes the amount of odor abating agents which must be used for reasons of safety and expense, which minimizes contact of the pet and pet owner to excreta and odor abating agents and which is accepted for use by the pet.

It is a further object of the present invention to provide such an animal excrement collection system which is inexpensive and which is widely adaptable to fit a variety of commercial litter boxes currently marketed.

A further object of the present invention is to provide a method of preparing the litter box system.

DISCLOSURE OF THE INVENTION

The present invention relates to an animal litter box system which reduces odor and extends the useful life of litter by delivering to and concentrating urine in an area designed specifically to prevent odor formation. This is preferably accomplished through the use of a substantially non-absorbent, substantially non-adsorbent granular litter material overlaying a sorbent means containing odor abating agents.

For purposes of this invention, "sorbent" means are defined as those means which are substantially absorbent and/or adsorbent to liquids. Absorbent materials are those which take in fluids and make them part of their structure, while adsorbent materials are those which retain fluids in a thin film on their surface. Such sorbent means would generally have capacities for fluid at least equal to their own weight. Examples of absorbent materials comprising sorbent means, as used herein, are comminuted wood pulp fluff, cellulose fibers, polymeric gelling agents (PGA) and combinations thereof. An example of an adsorbent material comprising sorbent means, as used herein, is perlite.

The present invention makes possible the use of odor abating agents which would otherwise not be feasible due to reasons of exposure to the animal and the pet owner or to prohibitive material costs. Since the granular litter employed in the practice of the present invention serves only as a medium for the animal to dig in and bury waste, it may be reused by employing a multiplicity of underlying sorbent means of the present invention.

The sorbent means may comprise a litter box liner comprised of a liquid impervious back sheet, a liquid pervious top sheet and a flexible sorbent core positioned between the back sheet and the top sheet. The sorbent core itself may be comprised of such materials as comminuted wood pulp fluff, polymeric gelling agents (PGA), other suitable sorbent materials or combinations thereof. Polymeric gelling agents are particularly preferred in sorbent means of the present invention, since they minimize evaporation of urine, thereby minimizing the inherent odor of the urine itself. Urine is instead "gelled" by the polymeric gelling agent and held within the sorbent means.

The odor abating agent may include such materials as acidic buffers, antimicrobials, bacteriostats, fungicides, odor adsorbents, deodorizers, masking agents, bacterial enzyme inhibitors or combinations thereof.

A particularly effective odor abatement combination employed in a preferred sorbent means of the present invention comprises an acidic buffer and an antimicrobial.

Such an odor abatement combination preferably consists essentially of an acidic buffering agent component and a non-toxic, non-irritating, non-volatile antimicrobial agent component. The buffering agent component and the antimicrobial agent component are preferably present within the pH control system in a weight ratio of from about 1:1 to about 2000:1.

Whatever materials are selected, the odor abatement system itself is preferably present within sorbent means of the present invention in an amount which is effective to maintain the pH of *Proteus vulgaris*-contaminated urine discharged into the sorbent means at a value below about 7.5. Especially preferred buffering agents for use in the pH control system of these articles are the slightly cross-linked, partially neutralized polymeric gelling agents which function both as buffering agents and sorbents for aqueous liquids discharged into the sorbent means.

BRIEF DESCRIPTION OF THE DRAWINGS

While the specification concludes with claims that particularly point out and distinctly claim the subject matter regarded as forming the present invention, it is believed that the present invention will be better understood from the following detailed description with reference to the drawings in which:

DETAILED DESCRIPTION OF THE INVENTION

The Granular Litter Material

Figure 1:
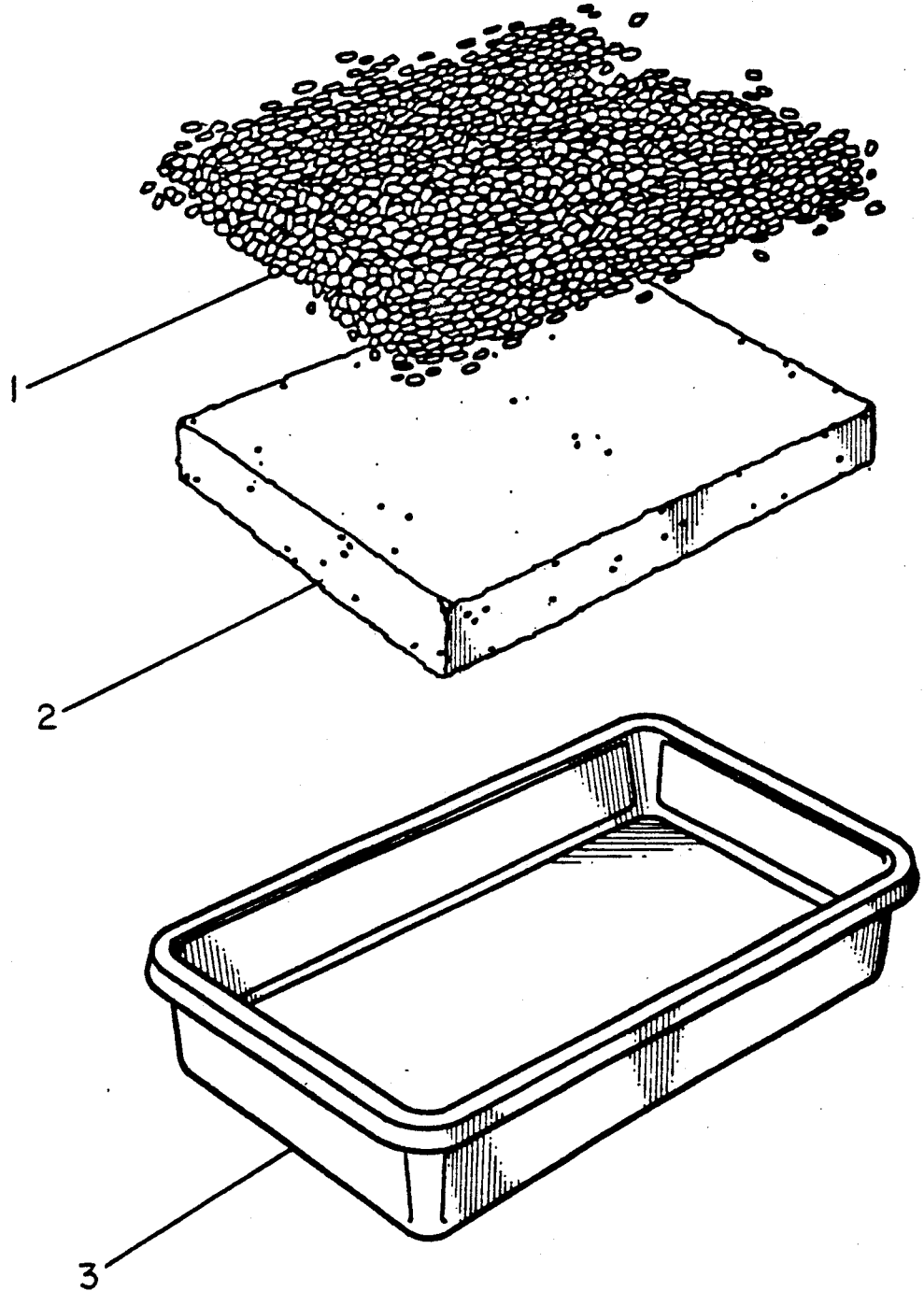
FIG. 1 shows an exploded view of a preferred embodiment of the present invention.

Since the granular litter material 1, shown in FIG. 1, used in the practice of the present invention need only satisfy the instincts of the animal to bury its waste, it is preferably non-sorbent and non-clumping. Most preferably, the granular litter 1 will provide for rapid and complete transfer of liquid to the underlying sorbent means 2, with minimal (if any) absorption or adsorption of the liquid by the granular litter. To accomplish this, the granular litter may, if desired, be coated with wetting agents such as silicones, waxes, polysorbates, alcohol ethoxylates and the like.

Suitable granular litter materials include, but are not limited to, gravels, slag, glass beads, ceramics and plastics. Even materials which are normally considered to be absorbent or adsorbent can be made acceptable for use in the present invention if they are first treated to render them substantially non-absorbent and non-adsorbent. Clays, fibrous particles and the like treated with a coating of wax, silicone, ceramic or the like can thus be employed.

The granular litter material 1 may be of any particulate size suitable for use by the animal. Litter particle sizes, as measured at their maximum dimension, preferably range between about 0.1 to 10 mm (0.004 to 0.4 inches). Most preferably, the particles employed in the practice of the present invention range between about 1 and about 6 mm (0.04 to 0.24 inches) in size.

If desired, the granular litter material may be treated with a dye to render its color more acceptable. An amount of odor abating agent may also be added to the granular litter material 1, since it is in contact with urine prior to the urine's draining into the underlying sorbent means 2. However, since the primary receptacle for urine in the practice of the present invention comprises the underlying sorbent means 2, the amount of odor abating agent added to the granular litter material 1 is normally minimal.

The Sorbent Means

FIG. 1 shows an exploded view of a simple sorbent means 2 of the present invention underlying the non-sorbent granular litter material 1. The sorbent means 2 may comprise any sorbent material such as a fibrous matt, foam, sponge or the like. The sorbent means 2 includes an odor abating agent. A litter box or receptacle 3 contains both the non-sorbent granular litter material 1 and the sorbent means 2 containing an odor abating agent.

The Odor Abatement Agent

A number of odor abatement agents may be employed in sorbent means 2 to prevent or reduce odor. These include acidic buffers, antimicrobials, bacteriostats, fungicides, odor adsorbents, bacterial enzyme inhibitors, or combinations thereof. A number of these agents will be discussed in more detail in the sections of the specification hereinafter set forth.

Acidic Buffering Agents

Acidic buffering agents prevent a rise in pH of the sorbent means 2 into the alkaline range. This involves the maintenance of aqueous fluids, e.g., urine, feces and/or mixtures thereof, discharged into and held within the sorbent means 2 at an acidic pH. This can be accomplished by taking steps to inhibit ammonia formation in the sorbent means 2, by donating protons to the discharged liquids held within the sorbent means or by a combination of these methods. Such acidic buffering agents further prevent volatile, Odoriferous ammonia and organic amines from escaping into the air. Protonation of these compounds with protons from an acidic buffer helps to prevent their volatilization.

One type of pH control agent or "buffering agent" frequently found in disposable sorbent articles comprises the slightly cross-linked polymeric gelling agents or "supersorbers" which serve to imbibe liquids discharged into the article. These materials frequently contain at least some unneutralized carboxylic acid or sulfonic acid groups in the polymer chain, and these acid groups can donate protons to fluid within the sorbent means. Polymeric gelling agents of this type are thus especially desirable components of the sorbent means, since they not only improve the sorbency characteristics of the article, but also provide at least some acid buffering capacity with respect to fluids contained within the article.

Whether the acidic pH control agent is of the polymeric gelling agent type or not, pH control agents alone will frequently not be able to provide sufficient buffering capacity to prevent a rise in the pH of urine or other discharged fluids within the sorbent means. This is because the amount of urine discharged into the typical sorbent means is often greater than the buffering capacity of the pH control agent. It has therefore been found generally desirable to employ an antimicrobial agent in combination with the acidic pH control agent. Particularly suitable antimicrobial agents are discussed in the following section of the present specification.

Antimicrobial Agents

A second highly preferred component of the pH control system utilized in particularly preferred sorbent means of the present invention comprises an antimicrobial agent. An antimicrobial agent, for purposes of this invention, can be any substance or moiety which either destroys microorganisms or inhibits, suppresses or prevents their growth and/or reproduction and/or metabolism when such microorganisms are present in the sorbent means. The antimicrobial agents particularly useful in sorbent means of the present invention are substances of the aforementioned type which are also substantially non-toxic, nonirritating and non-volatile, as described hereinafter.

It is believed that the antimicrobial agent functions in the pH control systems herein disclosed by preventing or reducing microbial growth or metabolism in the discharged liquid held within the sorbent means. Such reduced microbial growth or metabolism prevents or reduces microbial action on urine and/or feces in the sorbent means, thereby preventing or at least minimizing ammonia production. This is important, since excessive ammonia production will cause a rise in pH, even in the presence of a buffering agent. The antimicrobial agent component of the pH control system thus works in combination with the acidic buffering agent to maintain the pH of discharged fluid in the sorbent article below about 7.5. Since ammonia production is minimized, odor problems associated with the presence of ammonia are also alleviated.

Antimicrobial agents, including those useful in the pH control system herein disclosed, are generally well known materials. An extensive disclosure of various types of antimicrobial agents is found in Kirk-Othmer; *Encyclopedia of Chemical Technology*. Third Edition, Vol. 7, (1979) at pages 793-832, which is hereby incorporated herein by reference. Of the antimicrobial agents therein disclosed, those which are substantially non-toxic, non-irritating and non-volatile are particularly suitable for use in pH control systems of the present invention.

Antimicrobial agents used in the pH control system of the sorbent means herein employed are also preferably substantially non-volatile, i.e., those which will not evaporate or sublime out of the sorbent means to any significant degree during the time period between manufacture and use of the sorbent means. Thus, antimicrobial agents in solid form or antimicrobial agents which leave solid residues are particularly preferred for incorporation into the sorbent means employed in the practice of the present invention.

Of the various types of antimicrobial agents known in the art, highly preferred agents for use herein are the quaternary nitrogen-based antimicrobials and the bis-biguanides. These two types of antimicrobial agents have a combination of desirable properties, e.g., relatively high antimicrobial activity, relatively low toxicity and irritation potential and acceptable physical characteristics. Therefore they are particularly well suited for incorporation into sorbent means of the present invention.

The antimicrobial agents which contain a single quaternary nitrogen moiety include the hydrocarbyl substituted ammonium compounds as well as those compounds wherein the quaternary nitrogen is part of a heterocyclic ring, e.g., pyridinium compounds. Representative examples of suitable quaternary nitrogen-based antimicrobial agents include methylbenzethonium chloride, benzalkonium chloride, dodecyltrimethyl ammonium bromide, tetradecyltrimethyl ammonium bromide and hexadecyltrimethyl ammonium bromide. Heterocyclic quaternary nitrogen-based antimicrobial agents include dodecylpyridinium chloride, tetradecylpyridinium chloride, cetylpyridinium chloride (CPC), tetradecyl-4-ethylpyridinium chloride and tetradecyl-4-methylpyridinium chloride.

Other preferred antimicrobial agents are the bis-biguanides, which are generally described in the following references: Rose et al., U.S. Pat. No. 2,684,924, issued July 27, 1954; Senior et al., U.S. Pat. No. 2,990,425, issued June 27, 1961; Birtwell et al., U.S. Pat. No. 2,830,006, issued Apr. 8, 1958; and Birtwell et al., U.S. Pat. No. 2,863,919, issued Dec. 9, 1958, which patents are hereby incorporated herein by reference. The most preferred bis-biguanides are 1,6-bis(4-chlorophenyl)diguanidohexane, known as chlorhexidine, and its water-soluble salts. Especially preferred are the hydrochloride, acetate and gluconate salts of chlorhexidine.

Several other types of antimicrobial agents may also be especially useful in sorbent means of the present invention. These include the carbanilides, substituted phenols, metal compounds and rare earth salts of surfactants. Carbanilide materials include 3,4,4'-trichlorocarbanilide (TCC, triclocarban) and 3-(trifluoromethyl)-4,4'-dichlorocarbanilide (IRGASAN). Substituted phenols include 5-chloro-2-(2,4-dichlorophenoxy)phenol (IRGASAN DP-300). Metal compounds include zinc and stannous salts such as zinc chloride, zinc sulfate and stannous chloride. Rare earth salts of surfactants which may be employed are disclosed in European Patent Application No. EP-A-10819, published Oct. 29, 1980, which application is hereby incorporated herein by reference. Rare earth salts of this type include the lanthanum salts of linear $C_{10}$–$C_{18}$ alkylbenzene sulfonates (LaLAS).

Combined pH Control System

Some antimicrobial agents useful herein may be acidic in form and thus, it is possible that such agents could function as the acid buffer in the pH control systems herein in addition to acting as antimicrobial agents. It is preferred, however, that the acidic buffering agent and antimicrobial agent components of the pH control system not be the same material or moiety. Rather the acidic buffering agent and antimicrobial agent are preferably separate and distinct species, e.g., separate and distinct elements, compounds or moieties.

Whatever the nature of the antimicrobial agent component, it will generally be present in the pH control system of the sorbent means herein in an amount such that the weight ratio of acidic buffering agent to antimicrobial agent ranges from about 1:1 to 2000:1. More preferably, the weight ratio of buffering agent to antimicrobial agent within the pH control system will range from about 10:1 to about 1000:1. As can be seen from these ratios, the amounts of buffering agent and antimicrobial agent relative to each other can vary widely. This is because of the broad range of antimicrobial activity encountered in the various types of antimicrobial agents which can be employed in the pH control systems incorporated in sorbent means of the present invention.

The overall concentration of the pH control system employed in sorbent means of the present invention will depend upon the relative buffering capacity of the particular buffering agent selected and the relative strength of the particular antimicrobial agent employed. However, an appropriate concentration of the pH control system can be determined by referencing the effectiveness of the system in combatting the ammonia-producing effects of one particular microorganism, *Proteus vulgaris*. *Proteus vulgaris* is a microorganism which is representative of species which are commonly found in the intestinal tract and which are capable of degrading urea in urine to ammonia. Furthermore, *Proteus vulgaris* is a microorganism which is relatively resistant to antimicrobial agents and which is thus, in general, relatively difficult to control using only antimicrobial agents.

When selected for use in sorbent means of the present invention, the two-component pH control system should be utilized in an amount which is effective to maintain the pH of *Proteus vulgaris*-contaminated urine discharged into the sorbent means at a value below about 7.5. More preferably, the pH control system should maintain the pH of *Proteus vulgaris*-contaminated urine discharged into the sorbent means at a value below about 6.5. A standard procedure for determining the effectiveness of the pH control system in maintaining pH within these limits is disclosed in U.S. Pat. No. 4,842,593 issued to Jordan et al. on June 27, 1989 and hereby incorporated herein by reference.

When the acidic buffering agent comprises a partially neutralized, slightly cross-linked, hydrogel-forming absorbent gelling agent as hereinbefore described in detail, and when the antibacterial agent is selected from quaternary nitrogen-based compounds and bis-biguanides, and when the pH control system is found entirely within the sorbent means, it is generally possible to specify the concentration of the pH control system by quantifying the amount of absorbent gelling agent buffer and the amount of the antimicrobial agent in the sorbent means. For pH control systems of this type, the absorbent gelling agent buffer preferably comprises from about 2% to about 99% by weight of the sorbent means and the antimicrobial agent preferably comprises from about 0.02% to about 50% by weight of the sorbent means. More preferably, the absorbent gelling agent buffer will comprise from about 20% to about 99% by weight of the sorbent means, and the antimicrobial agent will comprise from about 0.05% to about 10% by weight of the sorbent means.

The two components of the pH control system incorporated into particularly preferred sorbent means of the present invention may or may not comprise distinct, discernible structural elements of the sorbent means. Thus, for example, either buffering agent and/or antimicrobial agent may be utilized in discrete particulate (including fiber) form such that these components are readily discernible within the sorbent means. Alternatively, one or both of the pH control system components may be intimately associated, for example, by coating, by impregnating, or by actually chemically bonding, with another structural element which may be present in the sorbent means, e.g., a top sheet, an underlying sorbent core or the like.

In one preferred sorbent means embodiment of the present invention, the acidic buffering agent component of the pH control system comprises a partially neutralized, slightly cross-linked hydrogel-forming polycarboxylate absorbent gelling agent in particulate form and, as hereinbefore described, is incorporated into the sorbent means of the present invention by intimately admixing such gelling agent particles within the material comprising the sorbent means.

Bacteriostats

Ammonia is one of the major components of malodors emanating from urine. This suggests that urease, the enzyme that converts urea to ammonia, is responsible for the odor development. However, it has been found that reducing ammonia levels to well below the olfactory detection threshold (ODT) does not necessarily eliminate the odor problem. It is hypothesized that sulfides and mercaptans, which have olfactory detection thresholds in the ppb (parts per billion) or even ppt (parts per trillion) range, greatly contribute to the malodor generally associated with animal litter boxes. In order to effectively prevent the development of malodors, an animal litter material must also be capable of eliminating sulfide and mercaptan odors.

Although any broad spectrum bacteriostat is suitable for use herein, including the alkyl monocarboxylic acids having from 3 to 9 carbon atoms, preferred bacteriostats are the halogenated aromatic hydrocarbons. By halogenated aromatic hydrocarbons, as used herein, is meant the halogenated bis-phenols. These bacteriostats are well known in the art, and generally used as disinfectants. Suitable examples are p-chloro-m-cresol; hexachlorophane; 2,4,4'-trichloro-2'-hydroxydiphenyl ether; trichlorocarbanilide (TCC); 2,4-dichloro-m-xylenol (DCMX); 3,4,5-tribromosalicylanilide (TBS) and 3,5,3',4'-tetrachlorosalicylanilide (TCS). In general, about 5,000 ppm of the bacteriostat in sorbent means of the present invention will effectively control odor.

Fungicides

It has also been found that in certain instances fungi may develop in the litter box. It is therefore particularly desirable to also incorporate a fungicide into sorbent means of the present invention in addition to a bacteriostat. Undecylenic acid at 2000 ppm level will effectively control the growth of fungi. Other suitable fungicides may also be employed.

Other Odor Abatement Agents/Means

Other odor abating agents and/or means which may be employed in sorbent means of the present invention may include, but are not limited to, bacterial urease inhibitors, odor adsorbents such as zeolites, activated charcoal and the like, masking agents, etc.

RETENTION OF LIQUIDS WITHIN THE SORBENT MEANS

U.S. Pat. No. 4,852,518 issued to Yananton on Aug. 1, 1989 teaches that litter box odors can be substantially prevented by evaporating urine to the air, causing the bacteria to die or become dormant. According to exemplary data set forth in the aforementioned patent, a structure constructed in accordance with Yananton's teachings will, in a 24 hour period, evaporate an amount of urine about equal to the average rate of a cat's application However, experience has shown that urine evaporation from the litter box is undesirable from the standpoint of exposure to the inherent odor of the urine itself.

In contrast to the teachings of Yananton, it has been found highly preferred in the practice of the present invention to substantially prevent the evaporation of liquid from the litter box in order to reduce the inherent odor associated with the urine itself. Thus, in a particularly preferred embodiment of the present invention, the amount of liquid evaporated from the litter box over a 24 hour period should be less than about 50% of that applied, and most preferably less than about 25%.

It has further been learned, in contrast to the teachings of the prior art, that the use of non-sorbent granular litter material in the practice of the present invention serves to concentrate the urine in the sorbent means below it, such that odor abating agents may be more efficiently utilized to prevent odors emanating from the urine itself, as well as those odors which may be generated from bacterial decomposition of the urinary components.

ALTERNATIVE EMBODIMENTS

Figure 2:
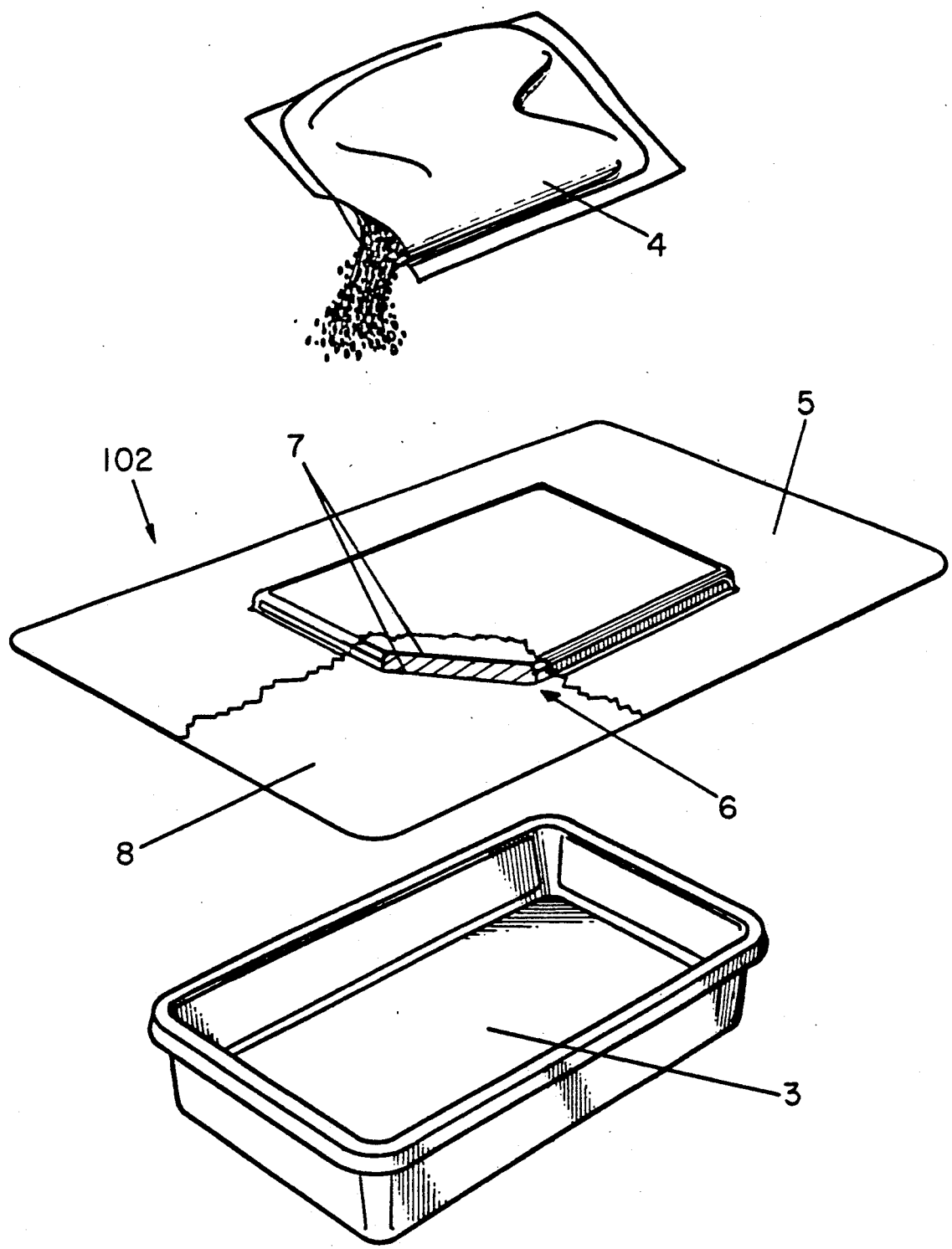
FIG. 2 shows an exploded view of another preferred embodiment of the present invention wherein the sorbent means comprises a multi-layer pad.

FIG. 2 is a simplified cutaway perspective view of another embodiment of the present invention in which the sorbent means 102 comprises a pad. Non-sorbent granular litter material 1 may be supplied in a bag 4.

The sorbent means 102 will generally comprise at least three basic structural elements. One such element is a liquid impervious back sheet 8. On top of this back sheet 8 is placed a second structural element which comprises a sorbent core 6. The sorbent core may itself comprise one or more distinct layers or zones. On top of the sorbent core is secured a third structural element comprising a liquid pervious top sheet 5. The sorbent core 6 includes one or more odor abating agents of the type previously described, as generally indicated at 7.

The sorbent means 102 is placed within the litter box 3 and the non-sorbent litter is thereafter poured onto its uppermost surface to initiate the use cycle.

Figure 3:
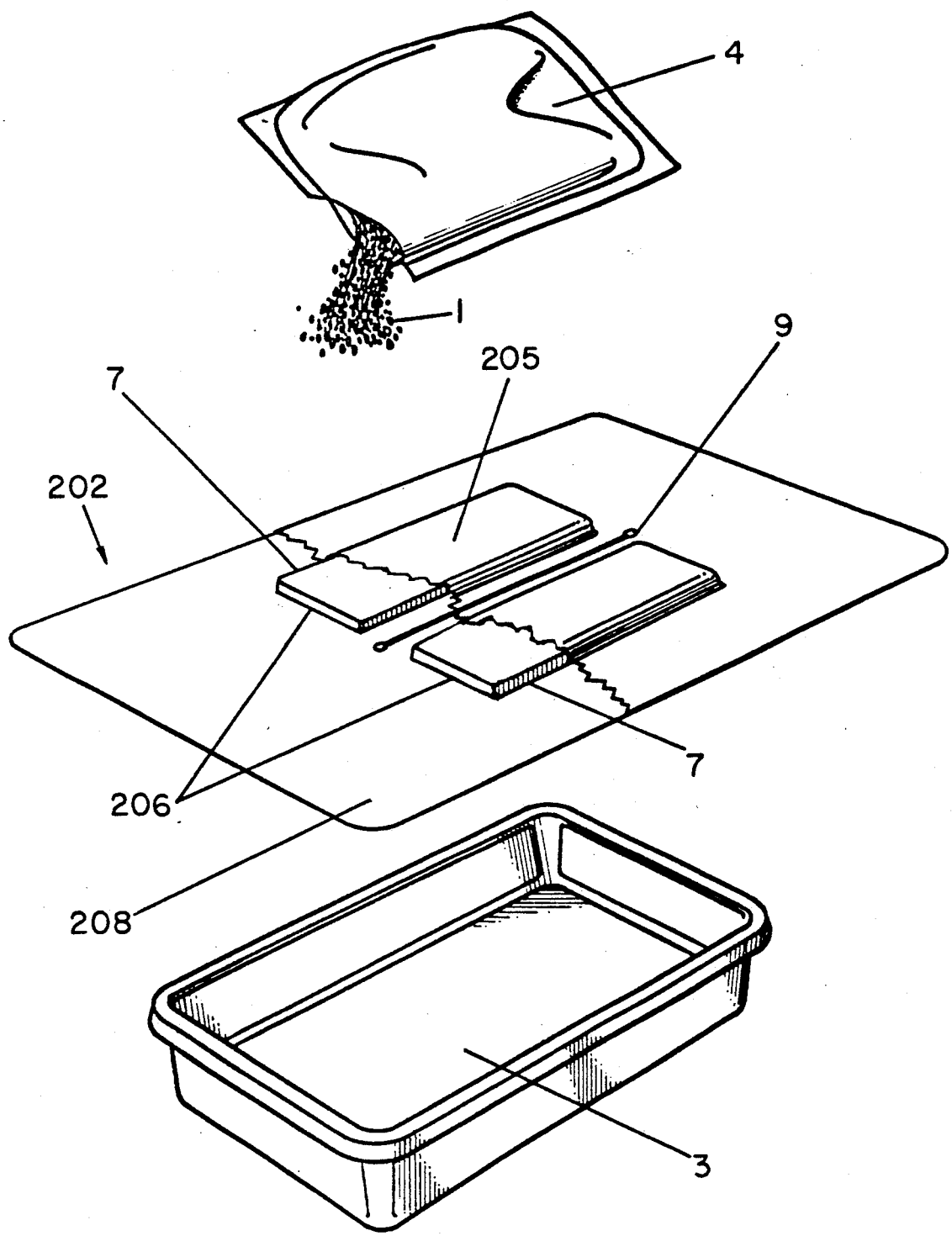
FIG. 3 shows an exploded view of still another preferred embodiment of the present invention wherein the sorbent means includes a longitudinally oriented slit.
Figure 4:
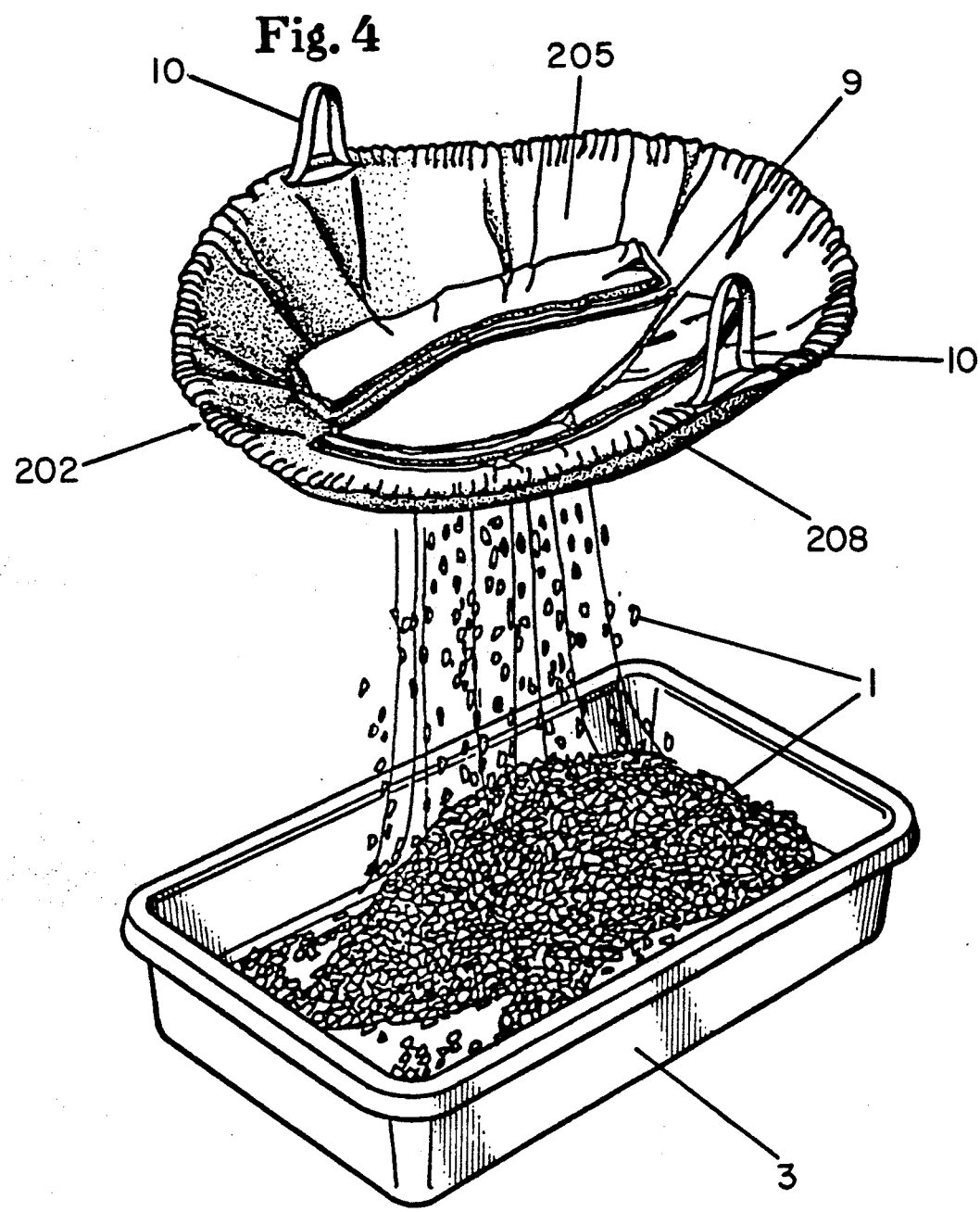
FIG. 4 illustrates how the sorbent means shown in FIG. 3 is separated from the granular litter.

In yet another embodiment of the present invention, as generally shown in FIG. 3, the sorbent means 202 may employ a sorbent core which is split into two distinct portions 206 separated by a longitudinal slit 9 extending through top sheet 205 and back sheet 208. This allows the sorbent means 202 to be removed from the litter box 3, as generally shown in FIG. 4, wherein the non-sorbent granular litter material 1 is shown falling through the slit 9 into the litter box 3. Optional drawstring handles 10, as shown in FIG. 4, may be added to sorbent means 202 to facilitate removal and handling. The present invention thus allows the urine to be removed from the litter box 3 independent of the non-sorbent granular material 1, such that the granular litter material may be re-used.

As can also be seen in FIG. 3, sorbent core portions 206 include one or more odor abating agents, as generally indicated at 7, of the type previously described to substantially prevent malodors from emanating from the sorbent means 202 during the use cycle.

Figure 5:
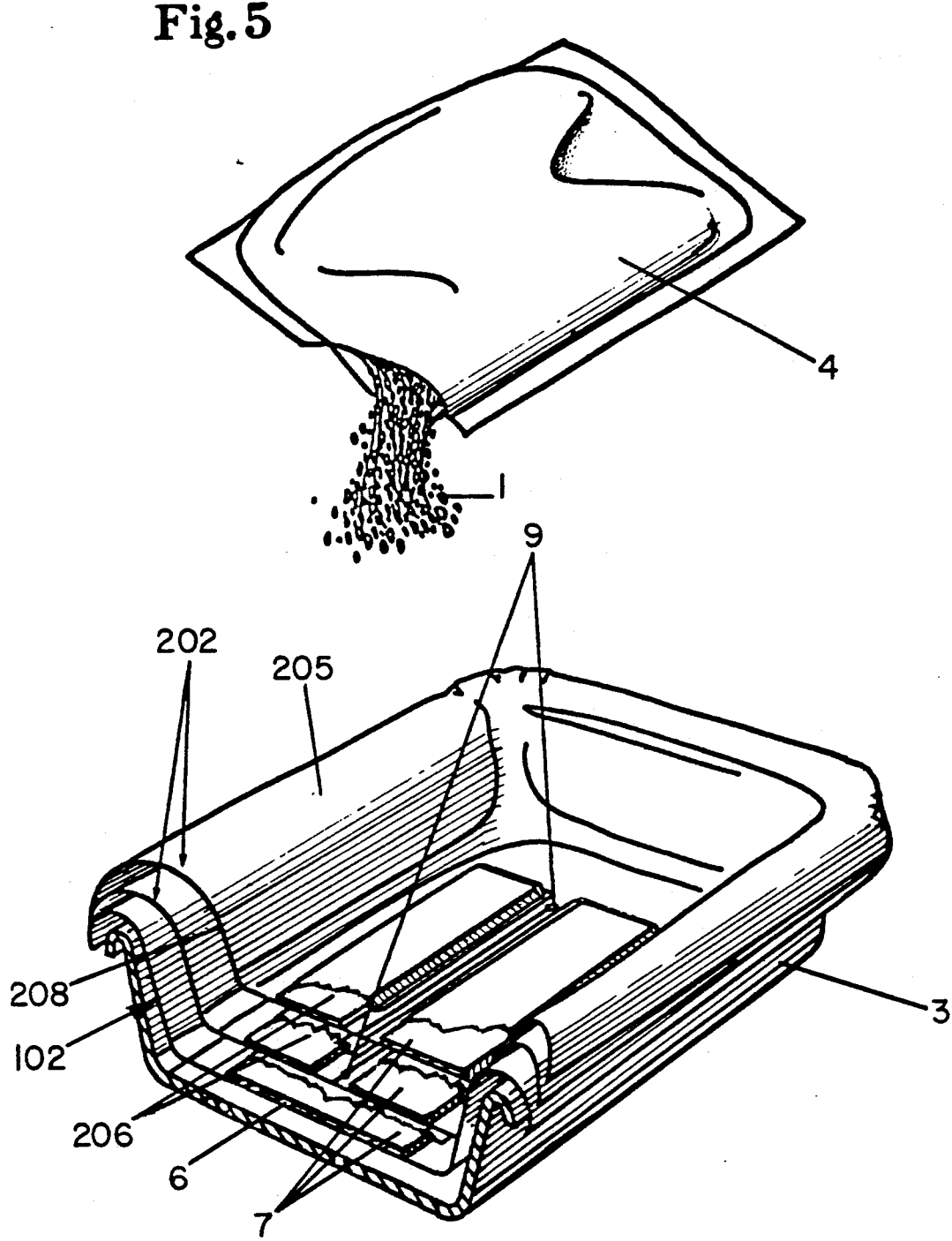
FIG. 5 is a simplified perspective cutaway view showing a stack of sorbent means of the type generally disclosed in FIG. 3 within a litter box.

FIG. 5 illustrates the stacking of a multiplicity of sorbent means 202 within a litter box 3. The bottom sorbent means 102 is preferably a solid pad with no longitudinal slit, as generally shown in FIG. 2. This allows both the sorbent means 102 and the non-sorbent granular litter material 1 to be simultaneously disposed of in a sanitary manner after completion of the last use cycle.

Figure 6:
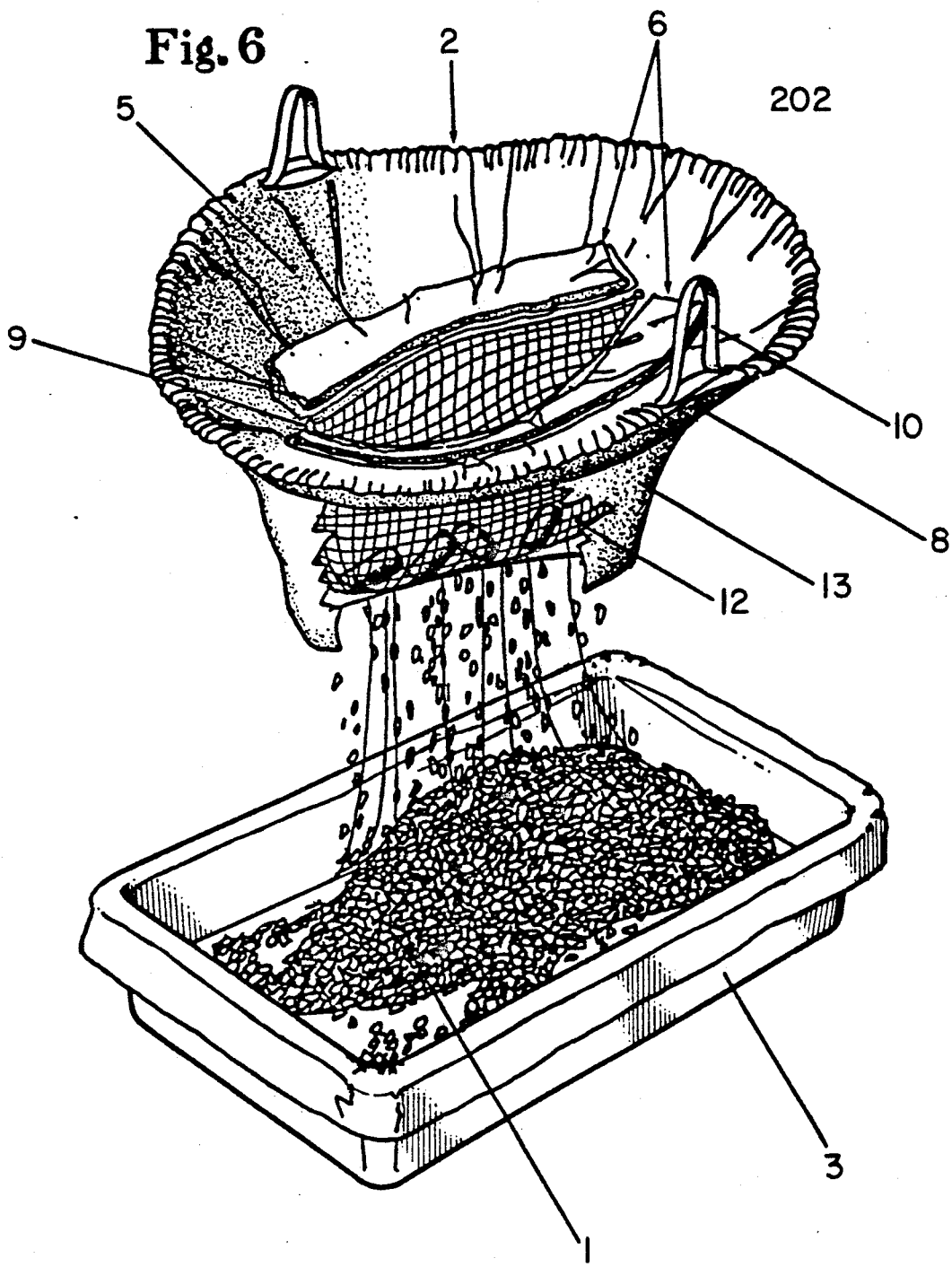
FIG. 6 is a cutaway view of still another preferred embodiment of the present invention, wherein the sorbent means includes an optional filter and lowermost shroud.

In a particularly preferred embodiment of the present invention, as generally shown in FIG. 6, the sorbent means 202 further includes means 12 for filtering solid waste from the non-sorbent granular litter material 1. The filtering means 12, which is preferably secured about the periphery of slit 9, allows solid waste, such as fecal matter, to be retained for disposal along with the spent sorbent means 202, while the non-sorbent granular litter material passes through for re-use. In this manner substantially all waste, both urine and fecal matter, may be removed by use of the sorbent means 202.

Filtering means 12 may comprise a porous mesh, a perforated or slit film, or the like, with openings sized such that the non-sorbent granular litter material 1 readily passes through while fecal waste is retained. An optional lowermost shroud 13 may also be included on sorbent means 202, as generally shown in FIG. 6, to permit more hygienic and sanitary disposal of the collected waste.

PREFERRED MATERIALS OF CONSTRUCTION FOR THE SORBENT MEANS

The Back Sheet

The back sheet of the sorbent means herein can be constructed, for example, from a thin, plastic film of polyethylene, polypropylene, or other flexible moisture impeding material which is substantially water impervious. Polyethylene, having a caliper of approximately 1.5 mils, is especially preferred.

The Top Sheet

The top sheet of the sorbent means herein can be made in part or completely of synthetic fibers or films comprising such materials as polyester, polyolefin, rayon, or the like, or of natural fibers such as cotton. In nonwoven top sheets, the fibers are typically bound together by a thermal binding procedure or by a polymeric binder such as polyacrylate. This sheet is substantially porous and permits a fluid to readily pass therethrough into the underlying sorbent core.

Another suitable type of top sheet comprises the three-dimensionally expanded, apertured film top sheets formed from liquid impervious polymeric materials, such as polyolefins. Such top sheets can have tapered capillaries of certain diameter and taper positioned in the top sheet to permit flow of discharged fluid through the top sheet into an underlying sorbent core. U.S. Pat. No. 3,929,135 issued on Dec. 30, 1975 to Thompson and U.S. Pat. No. 4,342,314 issued to Radel et al. on Aug. 3, 1982 are representative of such structures.

The Sorbent Core

A sorbent core, which may itself comprise one or more separate and/or distinct zones, e.g., layers, is preferably positioned between a back sheet and a top sheet to form the sorbent means used in the practice of the present invention. Such a sorbent core typically comprises a web or batt of hydrophilic fibrous material. For purposes of the present invention, a fiber is "hydrophilic" if water or aqueous body fluid readily spreads on or over the surface of the fiber (without regard to whether or not the fiber actually imbibes fluid or forms a gel).

The particular type of hydrophilic fibrous material is not critical. Any type of hydrophilic fiber which is suitable for use in conventional sorbent products is also suitable for use in the sorbent means herein. Examples of hydrophilic fiber material include cellulose, modified cellulose, rayon, polyesters such as polyethylene terephthalate (DACRON), and the like. Suitable hydrophilic fibers also include hydrophobic fibers which have been hydrophilized with a hydrophilizing agent. Such fibers include surfactant-treated or silica-treated thermoplastic fibers derived, for example, from polyolefins such as polyethylene or polypropylene, polyacrylics, polyamides, polystyrenes, polyurethanes and the like.

Sorbent agents may also be employed along with the fibrous material to further enhance the sorbent structure's liquid sorbent capacity. One highly preferred type of sorbent agent comprises the hydrogel-forming, polyacid-based absorbent gelling agents. These gelling agents, in addition to acting as buffering agents, also act as absorbents or gellants for aqueous fluids discharged into the sorbent core. Hydrogel-forming polymeric buffering agents of this type are those which, upon contact with fluids (i.e., liquids) such as water or body fluids, imbibe such fluids and thereby form hydrogels. In this manner, fluid discharged into sorbent means of the present invention can be acquired and held by such absorbent gelling agent buffers.

The particularly preferred absorbent gelling agent buffers used herein will generally comprise substantially water-insoluble, slightly cross-linked, partially neutralized, hydrogel-forming polymer materials prepared from polymerizable, unsaturated, acid-containing monomers. In such materials the polymeric component formed from unsaturated, acid-containing monomers may comprise the entire gelling agent or may be grafted onto other types of polymer moieties, such as starch or cellulose. Acrylic acid grafted starch materials are of this latter type and are especially preferred for use herein. Thus the preferred absorbent gelling agent buffers include hydrolyzed acrylonitrile grafted starch, acrylic acid grafted starch, polyacrylates, maleic anhydride-based copolymers and combinations thereof. Especially preferred absorbent gelling buffers are the polyacrylates and acrylic acid grafted starch.

The preferred absorbent gelling agent buffers useful in the present invention will have a capacity of from about 20 to about 70 grams, more preferably from about 30 to about 60 grams, of synthetic urine per gram of absorbent gelling agent buffer.

The absorbent gelling agent buffers hereinbefore described can be incorporated into the cores of the sorbent means of the present invention in the form of discrete particles. Such absorbent gelling agent buffer particles can be of any desired shape, e.g., spherical or semi-spherical, cubic, rod-like polyhedral, etc. Shapes having a large greatest dimension/smallest dimension ratio, like needles and flakes are also contemplated for use herein. Agglomerates of absorbent gelling agent buffer particles may also be used.

The size of the absorbent gelling agent buffer particles may vary over a wide range. For reasons of industrial hygiene, average particle sizes greater than about 30 microns are preferred.

The amount of polymeric gelling agent buffer particles incorporated in sorbent means of the present invention will depend upon the degree of buffering and absorbent capacity desired and the nature of the antimicrobial agent in the pH control system, as previously discussed. If, however, the absorbent gelling agent buffer is to effectively function as an absorbent as well as a buffer, the absorbent gelling agent buffer particles must be present in the absorbent core in particular concentrations. Thus, absorbent gelling agent buffers will preferably comprise from about 2% to about 100% by weight of the sorbent core.

Yet another sorbent core embodiment suitable for use in practicing the present invention comprises a laminate structure in which the sorbent material is sandwiched between two thin layers of fluid permeable material. The sorbent agent may be any absorbent or adsorbent medium such as foam, sponge, etc., but is preferably an absorbent gelling material. The material surrounding the sorbent agent may comprise any fluid permeable material, such as a thin fibrous layer. These thin layers of material aid moisture transfer into the sorbent material by the action of fluid wicking. In addition, they provide fluid exposure to a large surface area of the sorbent materials. The laminate layers are preferably bonded to one another by any suitable means, such as heat seals or an adhesive.

Continuous Recycling Of The Granular Litter Material

Since the preferred granular litter material employed in the practice of the present invention is substantially non-sorbent and durable, and since it serves only to allow the animal to dig and bury its waste, the granular litter material may be re-used almost indefinitely. This may be accomplished by placing a stack of sorbent means 202 in the litter box 3 beneath the non-sorbent granular litter material 1, as generally shown in FIG. 5. The used sorbent means 202 may then be removed periodically by, for example, grasping and lifting the uppermost sorbent means 202 located immediately beneath the granular litter material 1, and allowing the granular litter material to fall through the slit 9 in top sheet 205 and back sheet 208 onto the top of the next sorbent means 202 in the stack. In this way, the urine deposited by the animal is removed along with each sorbent means 202 of the present invention.

FIG. 6 discloses yet another preferred embodiment of the present invention which further includes a means 12 to filter solid waste from the non-sorbent granular litter material when the sorbent means 202 is lifted by the optional drawstring handles 10 shown in FIG. 6. In addition an optional shroud 13 is also provided to permit sanitary disposal of the waste material contained within sorbent means 202 and filter 12. Since an embodiment of the type shown in FIG. 6 removes both urine and fecal excrement from the non-sorbent granular litter material 1, the litter material may, as a practical matter, be re-used almost indefinitely.

Preferred Method For Producing A Sorbent Core

A sorbent core for incorporation in sorbent means of the present invention can be prepared with an air-laid absorbent core of southern softwood/pine fibers (Foley fluff) having distributed therein buffer particles of partially neutralized, sodium polyacrylate gelling agent buffer and having impregnated therein cetylpyridinium chloride (CPC) antimicrobial agent. This air-laid core can be prepared by disintegrating CPC-impregnated drylap and airlaying the resulting fibers into an absorbent web.

A. Drylap Preparation

To impregnate the drylap, a 5 inch wide roll of Foleu drylap, cut to the desired width, is preferably placed in a cylindrical tank containing a mixture of CPC and ethyl alcohol (30 mg of CPC per ml of EtOH). The CPC/EtOH solution is allowed to wick into the drylap completely. The soaked drylap is then placed in an oven (temperature of approximately 150° F.) equipped with an air blower. The oven and blower are preferably run until all of the alcohol is evaporated. Target concentration of CPC in the drylap is about 20 mg of CPC per gram of drylap (2% by weight).

B. Sorbent Core Preparation

The CPC-impregnated drylap is preferably fed into a millhouse disintegrator for disintegration and fluffing. Sodium polyacrylate gelling agent buffer particles are preferably dispersed into an air stream and laid down simultaneously with the fluff drylap on a copper screen in the manner generally described in U.S. Pat. No. 4,610,678 issued on Sept. 9, 1986 to Weisman et al., which patent is hereby incorporated herein by reference.

EXAMPLE I

A sorbent core for incorporation in sorbent means of the present invention was constructed generally in accordance with the foregoing method. The resultant core exhibited a density of about 0.2 g/cc and contained about 35% absorbent gelling material, about 1.4% CPC, and the balance Foley fluff. The core was inserted between a moisture impervious back sheet and a moisture pervious top sheet comprised of nylon and having a basis weight of about 0.02 g/sq. in. The weight of the resultant sorbent article was about 100 g. The sorbent article was placed in a litter box along with 10 lbs. of non-sorbent gravel, which provided an average depth of about 1.5 inches. The amount of CPC in the litter box system was thus about 150 ppm, including the weight of non-absorbent litter. A first system of the aforementioned type was used by one cat. No odor was noticeable for a period of 10 days.

A second identical system was used by one cat for a period of 13 days before a slight odor was detected.

A third system of the aforementioned type was artificially dosed daily with 50 ml/day of pooled cat urine. A very slight urine odor was detected after 10 of use. No ammonia odor was noticeable.

EXAMPLE II

A laminate sorbent core was constructed by uniformly distributing absorbent gelling material and CPC over a thin tissue sheet, lightly spraying with water, adding a second tissue sheet on top and allowing the structure to dry. The laminate covered a 200 sq in area and contained an absorbent gelling material comprised of sodium polyacrylate at a coverage of about 0.1 g/sq in. CPC was present at a coverage of 0.005 g/sq in. The resultant core was covered with a nonwoven top sheet and placed in a litter box with 15 lbs. of gravel, which produced an average depth of about 2 inches, thereby producing an overall concentration of CPC in this system of about 150 ppm. Two cats used the system for a period of 14 days, with no noticeable odor developing.

While particular embodiments of the present invention have been illustrated and described, it will be obvious to those skilled in the art that various changes and modifications can be made without departing from the spirit and scope of the invention, and it is intended to cover in the appended claims all such modifications that are within the scope of this invention.

What is claimed is:

1. A pet litter box system for the collection of solid and liquid animal excreta, said system being resistant to the development of objectionable odors in use, said system comprising:
    (a) a predetermined quantity of substantially nonsorbent, nonclumping granular litter material in which the animal may dig and or bury its solid excreta for deposition into said litter box;
    (b) a porous filtering member having an uppermost surface and exhibiting a pore size which will readily permit the nonsorbent, nonclumping granular litter material to pass therethrough, yet retain substantially all of the solid animal excreta coming in contact therewith during the filtering operation on its uppermost surface;
    (c) a protective member for insertion into said litter box, said protective member having a perimeter substantially coinciding with said litter box and an uppermost surface which contacts the nonsorbent, nonclumping granular litter material contained in said litter box in use and which is capable of substantially resisting damage when subjected to digging or clawing by animals secured in superposed relation to and completely overlying said uppermost surface of said porous filtering member, said protective member including means for forming an opening having a predetermined periphery in its uppermost surface when said protective member is lifted from the litter box to initiate the filtering operation, said filtering member being secured in underlying relation about said predetermined periphery of said opening in said protective member so that said filtering member is protected from damage due to digging or clawing by animals during the normal use cycle by said overlying protective member, yet substantially all of the nonsorbent, nonclumping granular litter material containing said solid animal excreta which is located on said uppermost surface of said protective member will pass through said opening and be filtered by said filtering member when said protective member is lifted from said litter box; and
    (d) a liquid sorbent means underlying said quantity of nonsorbent, nonclumping granular litter material and secured to said protective cover, said liquid sorbent means serving to absorb liquid animal excreta initially deposited on said nonsorbent, nonclumping granular litter material and passed therethrough substantially without absorption by said granular litter material, said liquid sorbent means further including an odor abatement agent to prevent or reduce the development of odor in the absorbed liquid, said liquid animal excreta contained within said sorbent means being removed from said litter box and disposed of along with said filtering member when said filtering operation has been completed.

2. The pet litter box system of claim 1, wherein said odor abatement agent is selected from the group consisting of: acidic buffers, antimicrobials, bacteriostats, fungicides, odor adsorbents, bacterial enzyme inhibitors and combinations thereof.

3. The pet litter box system of claim 2, wherein said odor abatement agent comprises a pH control system which will maintain the pH of the liquid contained in said sorbent means below about 7.5.

4. The pet litter box system of claim 3, wherein said pH control system comprises an acidic buffering agent in combination with an antimicrobial agent.

5. The pet litter box system of claim 4, wherein the weight ratio of acidic buffering agent to antimicrobial agent ranges from about 1:1 to about 2000:1.

6. The pet litter box system of claim 1, wherein said granular litter material is selected from the group consisting of: gravel, glass beads, coarse sand, plastic pellets, ceramic particles and combinations thereof.

7. The pet litter box system of claim 1, wherein said liquid sorbent means comprises a fluid pervious top sheet secured in overlying relation to a fluid impervious back sheet with a sorbent core interposed between said top sheet and said back sheet.

8. The pet litter box system of claim 7, wherein said top sheet and said back sheet are bonded to one another at least along their periphery.

9. The pet litter box system of claim 7, wherein said sorbent core is comprised of a material selected from the group consisting of: comminuted wood pulp fluff, cellulosic tissue, polymeric gelling agents (PGA) and combinations thereof.

10. The pet litter box system of claim 7, wherein said top sheet comprises a nonwoven material.

11. The pet litter box system of claim 7, wherein said top sheet comprises an apertured plastic film.

12. The pet litter box system of claim 7, wherein said sorbent core comprises a polymeric gelling agent (PGA) and wherein said odor abatement agent comprises a pH control system which will maintain the pH of the liquid contained in said sorbent means below about 7.5.

* * * * *

UNITED STATES PATENT AND TRADEMARK OFFICE
CERTIFICATE OF CORRECTION

PATENT NO. : 5,031,578

DATED : July 16, 1991

INVENTOR(S) : J. L. Hammons, W. R. Ouellette, B. W. Lavash

It is certified that error appears in the above-identified patent and that said Letters Patent is hereby corrected as shown below:

On the title page, under item [56] References Cited:
In the OTHER PUBLICATIONS section after "Means & Filter" add --
now U.S. Patent 5,038,721 issued on 8/13/91 --

In the OTHER PUBLICATIONS section add -- Co-Pending Commonly Assigned U.S. Patent Application of B. W. Lavash, Ser. No. 507,697 Filed April 10, 1990 (No Copy Supplied) Filtering & Disposal System For Granular Materials Such as Pet Litter now U.S. Patent 5,062,392 issued on 11/5/91. --

In the References Cited Section add the following references --

| | | | |
|---|---|---|---|
| 4,308,825 | 1/1982 | Stepanian | 119/1 |
| 4,471,717 | 9/1984 | Lander | 119/1 |
| 4,607,594 | 8/1986 | Thacker | 119/1 |
| 4,619,862 | 10/1986 | Sokolowski et al. | 428/221 |
| 4,727,824 | 3/1988 | Ducharme et al. | 119/1 |
| 4,824,810 | 4/1989 | Lang et al. | 501/84 |
| 4,961,930 | 10/1990 | Perdelwitz, Jr. | 424/411 |

FOREIGN PATENT DOCUMENTS

| | | |
|---|---|---|
| 2614-502-A | 11/1988 | France |

UNITED STATES PATENT AND TRADEMARK OFFICE
CERTIFICATE OF CORRECTION

PATENT NO. : 5,031,578

DATED : July 16, 1991

INVENTOR(S) : J. L. Hammons, W. R. Ouellette, B. W. Lavash

It is certified that error appears in the above-identified patent and that said Letters Patent is hereby corrected as shown below:

Column 5, line 53, "Odoriferous" should read -- odoriferous -- .

Column 11, line 15, after "material" insert -- 1 -- .

Column 14, line 3, "Foleu" should read -- Foley -- .

Column 14, line 48, after "10" insert -- days -- .

Signed and Sealed this

Second Day of March, 1993

Attest:

STEPHEN G. KUNIN

*Attesting Officer*  *Acting Commissioner of Patents and Trademarks*